United States Patent [19]

Castagnos, Jr.

[11] Patent Number: 4,664,888
[45] Date of Patent: May 12, 1987

[54] FLUID CATALYTIC CRACKING CATALYST-VAPOR SEPARATOR

[75] Inventor: Leonce F. Castagnos, Jr., Nederland, Tex.

[73] Assignee: Texaco Inc., White Plains, N.Y.

[21] Appl. No.: 749,338

[22] Filed: Jun. 27, 1985

[51] Int. Cl.$^4$ ................................................ B01J 8/24
[52] U.S. Cl. .................... 422/147; 422/144; 422/145; 423/157; 423/161
[58] Field of Search ................ 422/144, 145, 147; 423/157, 161

[56] References Cited

U.S. PATENT DOCUMENTS

| | | | |
|---|---|---|---|
| 4,002,438 | 1/1977 | Fleming | 422/144 |
| 4,313,910 | 2/1982 | Dries et al. | 422/147 |
| 4,500,423 | 2/1985 | Krug et al. | 422/144 |

Primary Examiner—Barry S. Richman
Assistant Examiner—William R. Johnson
Attorney, Agent, or Firm—Jack H. Park; Kenneth R. Priem; Richard A. Morgan

[57] ABSTRACT

A rough cut catalyst/vapor separator for fluid catalyst cracking risers which is located at the outlet of a riser and causes the oil-catalyst mixture to undergo a tight, 180 degree downward turn. The centrifugal separator is equivalent to one-half a turn inside a cyclone and causes most of the catalyst to move to the wall. Most of the oil vapors are squeezed out away from the wall. At the end of the separator is a shave-off scoop positioned to divide a predominantly catalyst phase from a predominantly oil phase. The shave-off scoops conduct the catalyst phase away from the center of the vessel and deposit it near the vessel wall where its downward flow is continued under the action of gravity. The oil vapor phase continue its downward flow for a while but then must undergo a 180 degree turn and flow upward to exit the vessel through a series of conventional cyclone separators. The second 180 degree turn of the oil vapors help separate catalyst which is not caught by the shave-off scoop.

5 Claims, 3 Drawing Figures

FLUID CATALYTIC CRACKING CATALYST-VAPOR SEPARATOR

BACKGROUND OF THE INVENTION

1. Field of the Invention

This invention relates to an apparatus for rapidly separating catalyst from vapor in the hot, high velocity reactor discharge in a fluid catalytic cracking process.

2. Prior Art

A number of fluid catalytic cracking (FCC) processes are known in the art. State of the art commercial catalytic cracking catalysts for these processes are highly active and possess high selectivity for conversion of selected hydrocarbon charge stocks to desired products. With such active catalysts it is generally preferable to conduct catalytic cracking reactions in a dilute phase transport type reaction system with a relatively short period of contact between the catalyst and the hydrocarbon feedstock, e.g. 0.2 to 10 seconds.

The control of short contact times, optimum for state of the art catalysts in dense phase fluidized bed reactors is not feasible. Consequently, catalytic cracking systems have been developed in which the primary cracking reaction is carried out in a transfer line reactor or riser reactor. In such systems, the catalyst is dispersed in the hydrocarbon feedstock and passed through an elongated reaction zone at relatively high velocity. In these transfer line reactor systems, vaporized hydrocarbon cracking feedstock acts as a carrier for the catalyst. In a typical upflow riser reactor, the hydrocarbon vapors move with sufficient velocity as to maintain the catalyst particles in suspension with a minimum of back mixing of the catalyst particles with the gaseous carrier. Thus development of improved fluid catalytic cracking catalysts has led to the development and utilization of reactors in which the reaction is carried out with the solid catalyst particles in a relatively dilute phase with the catalyst dispersed or suspended in hydrocarbon vapors undergoing reaction, e.g., cracking.

The cracking reactions are conveniently carried out in high velocity transport line reactors wherein the catalyst is moved from one vessel to another by the hydrocarbon vapors. Such reactors have become known in the art as risers or riser reactors. The catalyst and hydrocarbon mixture passes from the transfer line reactor into a first separation zone in which hydrocarbon vapors are separated from the catalyst. The catalyst particles are then passed into a second separation zone, usually a dense phase fluidized bed stripping zone wherein further separation of hydrocarbons from the catalyst takes place by stripping the catalyst with steam. After separation of hydrocarbons from the catalyst, the catalyst finally is introduced into a regeneration zone where carbonaceous residues are removed by burning with air or other oxygen-containing gas. After regeneration, hot catalyst from the regeneration zone is reintroduced into the transfer line reactor to contact fresh hydrocarbon feed.

As stated, state of the art catalytic cracking catalysts are highly active. With the introduction of these highly active catalysts the first separation zone has become a limiting unit operation. When catalyst is not rapidly separated from vapor and the vapor quenched once the desired reactions have taken place, the cracking reactions will continue with the concomitant production of less desirable products. Rough-cut cyclones have been used as a first separation stage between catalyst and vapor, followed by finer cut cyclones to remove fines from the vapor.

Rough-cut cyclones have enjoyed only limited success. The first limitation on their success is size. FCCU debottle-necks have been limited by rough-cut cyclone size, which can become too large to be contained efficiently in the reactor vessel. The second limitation is that high throughput rough-cut cyclones experience pressure and/or velocity pulsations which destroy the cyclone vortex and thereby reduce cyclone efficiency. No cure for the pulsation problem has been found and many refiners have resorted to removing the rough-cut cyclones from their fluid catalytic cracking units while retaining the finer cut cyclones. Refiners have suffered an economic debit over that theoretically attainable by resorting to this modification, but it allows them to continue to operate the FCCU, which they could not do with a rough-cut cyclone subject to vortex destroying pulsations.

Semicircular separation devices have been used in fluid catalytic cracking processes, e.g. U. S. Pat. Nos. 2,337,684; 2,378,607 and 4,219,407. However, their full potential in separating catalyst from vapor in a hot, high velocity stream, discharged from a fluid catalytic cracking reaction zone is heretofore unrecognized.

DETAILED DESCRIPTION OF THE DRAWINGS

Figure 1:
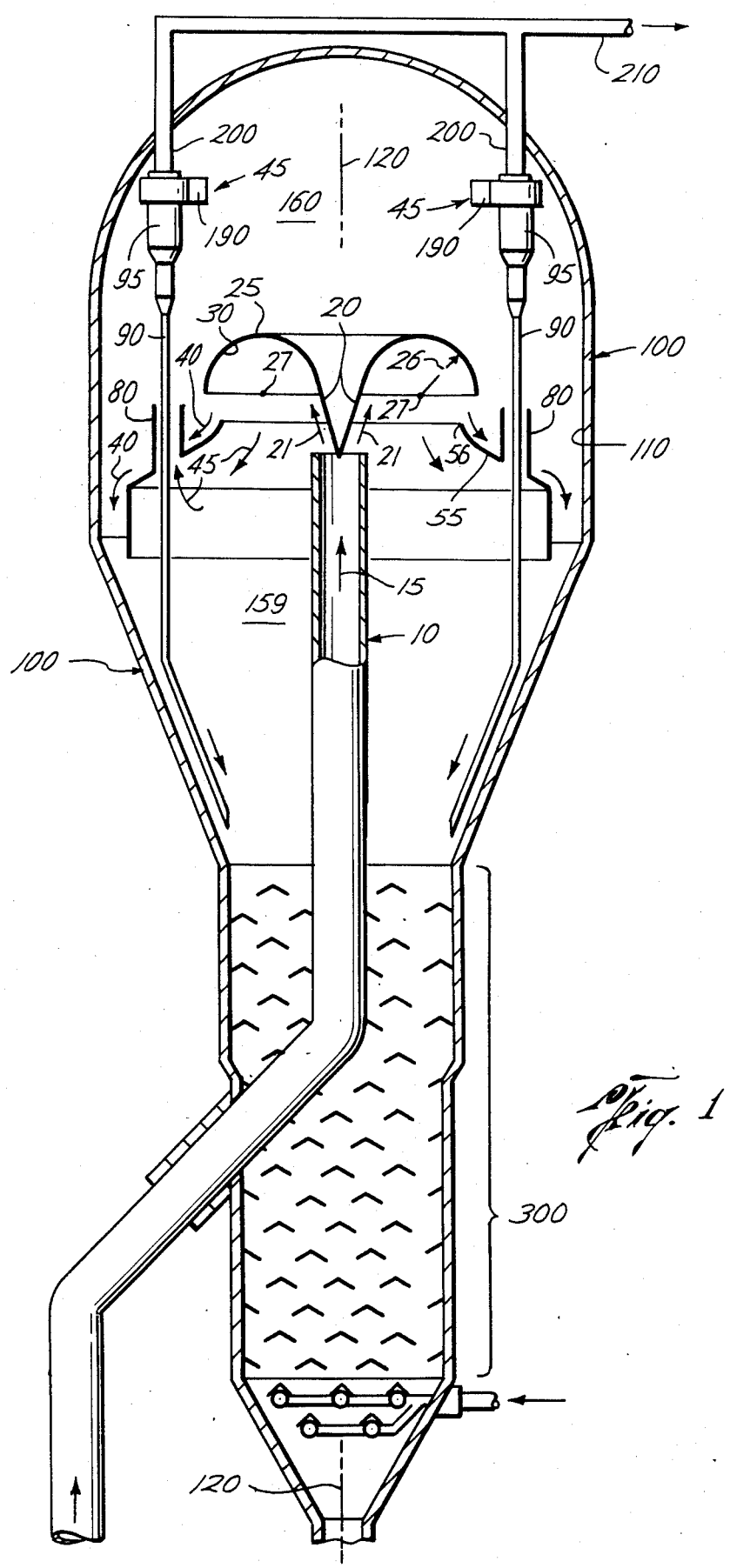
FIG. 1 is a side view of a separator apparatus in a fluid catalytic cracking stripper vessel.

In order to demonstrate and provide a better understanding of the invention, reference is made to the drawing.

Figure 2:
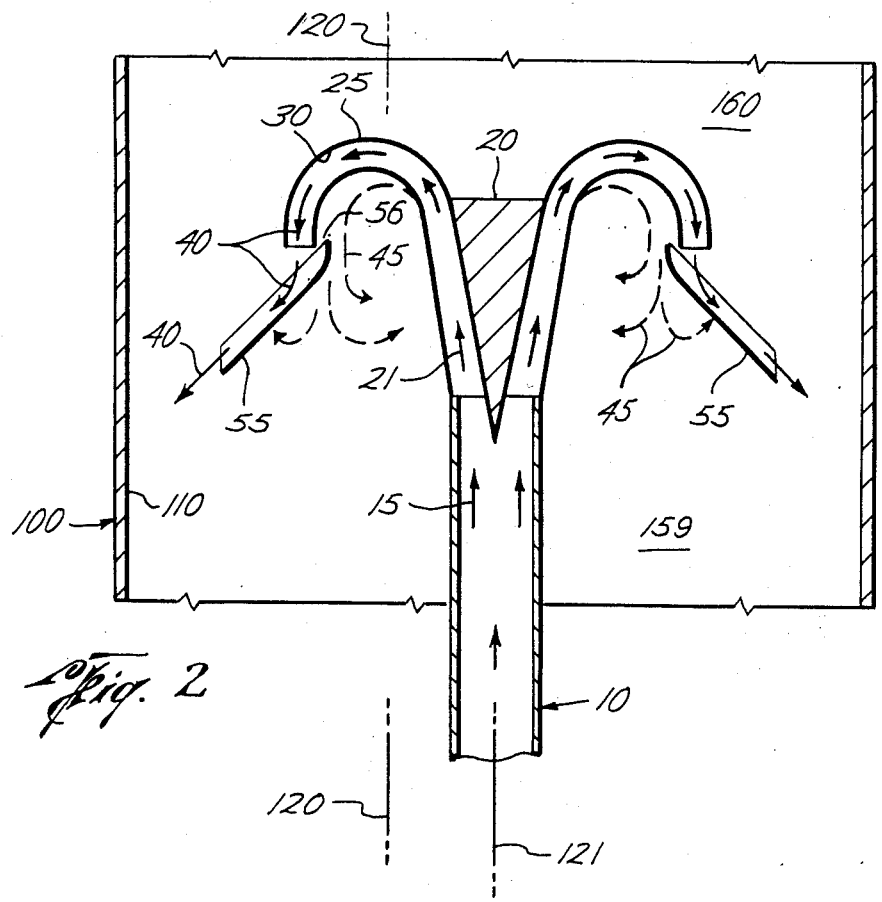
FIG. 2 is a side view of an alternate arrangement of a separator apparatus.

FIGS. 1 and 2 are a schematic representation of a side view of a separator apparatus.

A fluid catalytic cracking riser reactor 10 contains an upflow stream 15 comprising cracked product vapor and catalyst. Deflecting means 20, in FIG. 1 a right circular conical member in FIG. 2 a four sided tapered plug, converts upflow stream 15 to deflected upflow stream 21 which is directed toward a semi-circular centrifugal separator 25 of radius 26 from horizontal axis of rotation 27. In FIG. 1 separator 25 is horizontally continuous and a locus of points comprising the sum of the axis of rotation 27 forms a circle in the horizontal plane. Separator 25 comprises a semicircular surface 30 against which the stream travels and thereby causes the centrifugal disengagement or separation of the stream into a downward flowing predominantly catalyst phase 40 which is in contact with or near the semicircular surface 30 and a predominantly cracked product vapor phase 45. The vapor phase 45 is spaced from the semicircular surface 30 by the presence of the predominantly catalyst phase 40. The semicircular centrifugal separator 25 is in flow communication with the reactor vessel 100 and therefore the predominantly cracked product vapor phase 45 is free to enter the vapor space 159 below the separator in flow communication with the vapor space 160 above the separator.

Scoop 55 separates the predominantly catalyst phase 40 by means of a shave edge 56 located proximate to the semi circular surface 30. The shave edge 56 catches predominantly catalyst phase 40 moving generally in contact with and proximate to the semicircular surface 30. The scoop directs the predominantly catalyst phase 40 away from the reactor vessel center line 120; which may or may not be coincident with the riser reactor center line 121, and deposits it adjacent the reactor vessel wall 110 where it continues to flow downward under the force of gravity to a stripping zone 300.

The scoop 55 directs the predominantly cracked product vapor phase 45 away from the predominantly catalyst phase 40 and toward a vapor space 159 below the separator 25. From there, the predominantly vapor phase 45 may flow directly or through for example vent stack 80 to a vapor space 160 above the separator 25. The second 180° turn of the oil vapor phase helps separate catalyst which is not caught by the shave edge 55. At this point, the vapor exits the reactor vessel 100 by any number of means known in the art. Preferably predominantly cracked product vapor phase 45 enters cyclone separator 95 through vapor inlet 190. In cyclone separator 95, vapor is centrifugally separated from catalyst fines and vapor exits the reactor vessel 100 through vapor outlet 200 into header 210. Separated catalyst fines enter cyclone separator dipleg 90 and is combined with predominantly catalyst phase 40 in the stripping zone 300.

Figure 3:
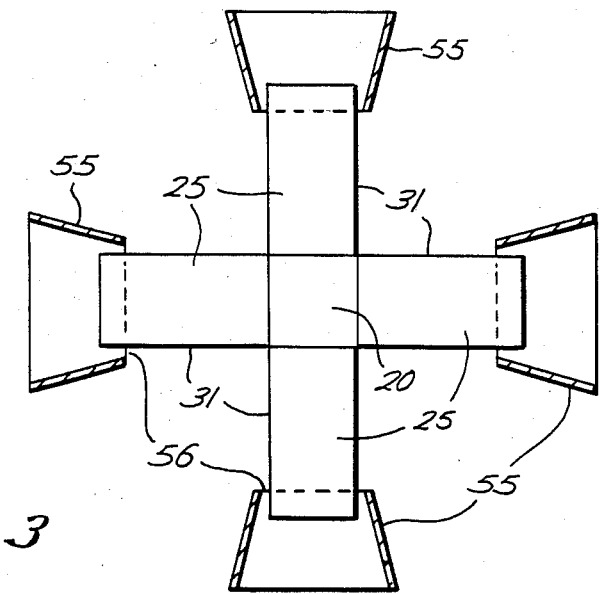
FIG. 3 is a sectional view of the separator apparatus.

FIG. 3 is an overhead view of FIG. 2. The number of semicircular separators is not critical, e.g. one, two, three or more. In FIG. 3 there are four semicircular centrifugal separators 25 and four scoops 55. The scoop 55 may have a scoop side wall 31. Such a side wall is not essential as seen in FIG. 1 wherein the semicircular cyclone separator is horizontally continuous and no side wall is necessary to retain material on the semicircular surface 30.

The shave edge 56 is positioned at the calculated phase interface to shave predominantly catalyst phase 40 located proximate to semicircular surface 30 and direct it into scoop 55. The location of the interface relative to the semi-circular surface is a function of catalyst to oil ratio; surface area of the curved path, catalyst flow rate and catalyst velocity as it slows along the semicircular surface. At a given catalyst to oil ratio and catalyst circulation rate a catalyst layer density along the semicircular wall can be predicted. Then from the dimensions of the separator the catalyst phase thickness is calculated. The shave edge is positioned at the catalyst-vapor interface. Once the position of the shave edge is initially determined, it can be repositioned to improve performance.

SUMMARY OF THE INVENTION

An improved separation apparatus has been found which rapidly separates catalyst from gaseous reaction products at the outlet of a transport line or riser reactor. The apparatus employs centrifugal force to separate the solid catalyst particles from gaseous reaction products. Centrifugal force is accomplished by means of a semicircular centrifugal separator fitted at the end of the riser reactor in such a manner as to minimize resistance to flow and thereby minimize the slip factor in the riser. After an upward to downward semicircular turn, catalyst is disengaged from vapor. Disengaged catalyst is separated by means of a shave edge and scoop and deposited near the wall of the catalyst stripper vessel where it falls under the force of gravity to a stripping zone. The vapor is directed away from the catalyst to a vapor zone and optionally to fine cut centrifugal separators where residual catalyst fines may be removed.

DESCRIPTION OF THE PREFERRED EMBODIMENTS

The desirability of rapidly separating the reaction products from the solid catalyst particles at the outlet of the riser reactor in the fluid catalytic cracking process is well known. Modern fluid catalytic cracking units employ riser or transfer line reactors designed for contact times in the range of about two to about five seconds. With modern zeolitic cracking catalysts having high conversion activity, two to five seconds of contact time is sufficient in most cases to obtained the desired conversion of the vacuum gas oil feedstock to middle distillate, gasoline, and $C_3/C_4$ products. Any prolonged contact of oil and catalyst beyond the optimum reaction time leads to excessive buildup of by-product coke on the catalyst surface and the recracking of the desirable gasoline and middle distillate products to form less desirable gaseous products. Therefore, it is important to rapidly separate the cracked hydrocarbon products and the spent cracking catalyst particles as soon as the desired degree of contact time has been achieved. Moreover, the modern riser cracker is designed to operate as nearly as possible in a plug flow mode with cocurrent flow of catalyst particles and hydrocarbon vapors and minimum backmixing. Many designers of FCC units employ straight, vertical risers to achieve a low level of backmixing in the reactor.

A number of devices have been in use commercially which are designed to promote rapid separation of catalyst from the cracked products at the outlet of a riser reactor. Among these are the rough-cut cyclone e.g. U.S. Pat. No. 4,364,905 and the "Dragonhead" e.g. U.S. Pat. No. 3,448,037. The apparatus disclosed herein is seen to have advantages over these separators and other types of separators used in this service. The rough-cut cyclone consists of a cyclone separator or group of cyclone separators located at the outlet of a riser or transport line reactor and operates on the same principle as any cyclone separator used to separate solids and gases.

A major disadvantage of the rough-cut cyclone is its requirement for a vertical orientation of the cyclone body and a horizontal inlet. This requires that the normally vertical riser undergo a 90° bend to enter the rough-cut cyclone. Any bend or direction change in the riser results in a loss of pressure head due to the increased resistance to flow. The riser itself is also subject to increased erosion due to the scouring action of the catalyst against the riser wall along the outside curve of the bend. A bend in the riser also causes the catalyst particles to lose velocity relative to the hydrocarbon vapors which represents an increase in the slip factor and increased catalyst backmixing. This represents a departure from the ideal, or plug flow operation, desired for the fluid catalytic cracking reaction. Some designers of FCC equipment employ a modified tee arrangement to accomplish the transition from vertical to horizontal flow. This effectively reduces the erosion associated with the 90° turn but also results in a major disruption to catalyst flow and a large increase in slip factor. In the modified tee arrangement the majority of the catalyst is slowed appreciably or comes to a complete halt as it impacts against the dead zone at the end of the tee and must then be reaccelerated in a horizontal direction. The result is an appreciable loss in pressure head, an increase in slip factor, and a departure from the ideal plug flow mode.

In a Dragonhead separator, the riser first undergoes a 45° turn from vertical and then the catalyst and oil vapors impinge upon a flat plate oriented at 90° to the axis of flow in the riser. The impingement causes the catalyst particles to lose forward velocity, after which they are accelerated in the downward direction by the action of gravity and the downward flowing oil vapors. The major disadvantages of Dragonhead separators are seen to be the requirement for a 45° riser turn, the increase in slip factor and catalyst backmixing as a result of the loss in catalyst velocity at the impingement plate, and the low overall separation efficiency compared to a rough-cut cyclone separator.

The present separator has significant advantages over the rough-cut cyclone, the Dragonhead and other devices which have been in use to rapidly separate catalyst and oil at the outlet of a short contact time, transport line reactor. The present separator is designed to be fitted at the outlet of a vertical riser and therefore causes minimal increase in resistance to flow or loss in velocity head by the catalyst. As a result, the low slip factor inherent in the straight, vertical riser is not compromised by having the riser undergo a bend or by attaching to it a device which causes significant catalyst/oil backmixing. Also, the device is relatively simple to construct and can be protected from the erosive action of catalyst particles by techniques known in the art such as the use of an erosion resistant refractory lining or hard surfacing. The apparatus has a relatively high separation efficiency, somewhat better than the efficiency of the Dragonhead separator though not as efficient as a rough-cut cyclone. The device is equivalent to one-half a spiral in a cyclone separator.

Some cyclone manufacturers have reported that rough-cut riser cyclones are subject to pulsations or puffing which severely hinders separation efficiency. The present separator of open construction and allowing free expansion of vapors once they leave the reactor riser, is not subject to pulsations or puffing.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the following claims be embraced thereby.

What is claimed is:

1. In a fluid catalytic cracking reactor vessel comprising a riser reactor within said reactor vessel and a separator apparatus for rapidly disengaging and separating catalyst from cracked product vapor in an upflow stream discharging from said riser reactor into said reactor vessel, wherein the improvement comprises:
    (1) deflecting means, in flow communication with the riser reactor, for deflecting the upflow stream toward
    (2) a semicircular centrifugal separator in flow communication with both the deflecting means and the reactor vessel, said centrifugal separator comprising at least one separating surface with a semicircular cross section which is rotated about a vertical axis of rotation, said separating surface being positioned to cause said upflow stream to flow semicircularly and downward thereby centrifugally disengaging the stream into a downward flowing predominantly catalyst phase in contact with the semicircular surface and a predominantly cracked product vapor phase spaced from said semicircular surface, with said space defining a catalyst-vapor phase interface
    (3) scoop means comprising a shave edge positioned at a location coincident with said catalyst-vapor phase interface for dividing and thereby separating predominantly catalyst phase from the predominantly cracked product vapor phase; and a baffle member attached to and extending from said shave edge for directing the predominantly catalyst phase away from said riser reactor and depositing the predominantly catalyst phase adjacent the reactor vessel inside wall.

2. The apparatus of claim 1 wherein the apparatus includes cyclone separators in flow communication with the semicircular centrifugal separator.

3. The apparatus of claim 1 wherein said separation surface is continuous and defines a generally torroid-shaped centrifugal separator.

4. The apparatus of claim 1 wherein said centrifugal separator is discontinuous and contains a plurality of said separating surfaces which are spaced around a circle defined by the rotation of the center of said semicircular cross-section about said vertical axis.

5. The apparatus of claim 4 wherein the separator apparatus includes four separating surfaces.

* * * * *